United States Patent [19]

Thrower, Jr. et al.

[11] 4,114,071
[45] Sep. 12, 1978

[54] LIGHT MODULATOR SYSTEM

[75] Inventors: Herbert T. Thrower, Jr., 2612 C Park Rd., Charlotte, N.C. 28209; Donald S. Wasness, Spartanburg, S.C.

[73] Assignee: Herbert T. Thrower, Jr., Charlotte, N.C.

[21] Appl. No.: 733,321

[22] Filed: Oct. 18, 1976

[51] Int. Cl.² .......................... H05B 37/02; B60Q 1/02
[52] U.S. Cl. ........................................ 315/226; 315/82
[58] Field of Search .................. 315/172, 201, 200 A, 315/226, 186, 216, 225, 226, 209 R, 209 T, 209 M, 209 SC, 76, 77, 82, 200 A; 340/76, 81 R, 83

[56] References Cited

U.S. PATENT DOCUMENTS

| 2,918,607 | 12/1959 | Peepas et al. | 315/172 |
| 3,390,304 | 6/1968 | Scott et al. | 315/226 |

Primary Examiner—Alfred E. Smith
Assistant Examiner—Robert E. Wise
Attorney, Agent, or Firm—Wellington M. Manning, Jr.; Luke J. Wilburn, Jr.

[57] ABSTRACT

A system is disclosed and claimed herein for modulating the intensity of a light particularly a light used on a vehicle, boat, or electrically connected between a source of power and an incandescent lamp to be modulated and includes a first timer switch means to cut the light on and off according to a periodic rate, a second timer switch means in parallel with the first timer switch means and being operated at a faster switch cycle such that the lamp does not go completely out whereby the filaments remain hot at all times, and a power interrupter means that is positioned between a source of power and the incandescent lamp, and is connected to the first and second timer switch means and operated thereby to modulate intensity of the lamp without complete loss of intensity.

14 Claims, 6 Drawing Figures

LIGHT MODULATOR SYSTEM

BACKGROUND OF THE INVENTION

Certain techniques are presently existent by which lights may be turned on and off, may be rotated or otherwise treated to improve the visual observational effects of the light to better attract attention thereto for safety or other reasons. In particular, police cars utilize a light mounted atop the vehicle which is rotated or flashed by turning on and off and which is housed in a blue cover whereby same can be readily observed during emergency or other situations when it is desirable for the driver of the car to actuate the light. Likewise, emergency vehicles, ambulances, wreckers and the like find need for similar lights to attract attention and thereby alert the general public in an immediate vicinity of the passing presence of the vehicle. Once the vehicle is visually observed, pedestrians and other drivers can immediately move out of the way of the vehicle and thus not impede the vehicle in its intended mission.

In certain situations, emergency vehicles having a flashing light atop of the car are not visually identifiable as same, particularly in heavy traffic where the emergency vehicle is close behind another vehicle and the field of vision of the rear view mirror of the front vehicle does not permit observation of the flashing light. The present invention provides a system for modulation of the head lights of the emergency vehicle which are in line of sight through the rear view mirror and thus could be readily recognizeable by a private citizen in the event the emergency vehicle is located immediately behind him. The private citizen could thus move out of the way and permit the vehicle to pass to its destination.

A further very definite area of need from a safety standpoint is found in the use of motorcycles, motorbikes or the like. Many states presently require, by law, that a motorcycle driven on a public highway burn the head light at all times to foster visual recognition of the cycle. Even though this precaution is taken, there are still large numbers of fatalities that occur, involving motorcycles where conventional vehicles have pulled into the path of an oncoming motorcycle, the driver of the conventional vehicle not having realized that the motorcycle was in the vicinity. In other words, the constant burning of the head light, while an improvement is apparently not sufficient to totally alert others in an area of the presence of the cycle in the same general area. Additionally, other safety lights such as stop lights, boat lights and the like are fraught with the same disadvantages, in that, though lights are burning, it is oftentimes difficult for one in the general vicinity to observe same. The present invention provides a means to modify the above problems by modulating the intensity of the lights at a rate such that there is never a loss of intensity of the light which could cause damage to a filament as well as an excessive loss of power, but which modulates at a rate that a normal sight path of a glance would receive modulation. A better visual detection system of the existence of the safety light is thus provided whether a stop light, boat light, motorcycle light, police car or emergency vehicle light or the like.

There is no known prior art that would teach or suggest the light modulation system of the present invention.

SUMMARY OF THE INVENTION

It is an object of the present invention to provide a system for use in conjunction with incandescent lights to modulate the normal intensity of the light for better visual observation of same.

Another object of the present is to provide a light modulator system that may be connected into a vehicle lighting system to modulate a vehicle head light.

Still another object of the present invention is to provide a light modulator system that is capable of modulating a vehicle light system with horizontal switching between pairs of lights.

Yet another object of the present invention is to provide a light modulating system to produce a pulsing of light intensity for better visual observation of same.

Generally speaking, the light intensity modulation system of the present invention comprises a first timer switch means electrically connectable between a source of electric power and at least one incandescent lamp; a second timer switch means connected in parallel with said first timer switch means and being operated at a faster switch cycle than said first timer switch means, said second timer switch means overriding said first timer switch means in an off mode and operating at a switch cycle sufficiently fast to preclude complete loss of intensity of said lamp; and power interrupter means connected between said source of power and said at least one lamp, said power interrupter means further being connected to and operated by said first and second timer switch means to modulate power to said at least one lamp whereby the intensity of said at least one lamp changes without a complete intensity loss.

More specifically, the modulator unit of the present invention may employ integrated circuits such that the physical size of the unit may be small and thus easily positionable at numerous locations between the source of power and the incandescent lamp. For example, the timer switch means may be separate integrated circuits or may be a double unit where the two switch means are connected in parallel and where the faster duty cycle timer switch means overrides the slower duty cycle timer switch means in the off mode to preclude a complete loss of intensity of the lamp. In this vein, by appropriate circuitry, the duty cycle of the timer switch means may be modified to determine the switch cycle and intensity loss of the lamp during modulation.

A power interrupter means suitable according to the present invention may be any means that is connectable between the power source and the lamp to permit full intensity power requirements to be received at the lamp in the on mode while interrupting the power to the lamp as designated by the net effect of the two timer switch means. In particular, a power transistor is quite suitable and preferred, though other devices such as silicon controlled rectifiers and the like may be employed. Likewise, depending upon the intended function of the system, a power transistor may be connected in series with a driver transistor with the driver transistor being operated by the net effect of the timer switch means which, in turn, acts on the power transistor to interrupt power to the lamp as dictated.

In a further embodiment of the present invention, as generally alluded to above, the modulation may occur between separate lights as opposed to modulating the output intensity of a single incandescent lamp. With such an arrangement, by way of an example, oppositely structured transistors may be employed such that the two transistors are 180° out of phase, with only one of the transistors functioning at any one time, and with each transistor being electrically connected to one or both head lamps of an emergency vehicle on one side of the car only while the other is connected to the oppositely positioned lamp or pair of lamps as the case may be. In this arrangement, the rate of switch cycle precludes a complete loss of intensity of either lamp, while switching from lamp to lamp to create the visual observation of pulsing of the head lights.

In the embodiment for use on a motorcycle to modulate the intensity of the motorcycle head lamp, the system may be further provided with means to actuate and deactuate same depending upon ambient light conditions. For nighttime riding of the motorcycle, for example, the system may be at least partially deactuated automatically upon sensing the lack of ambient light. Such as arrangement could, for example, include a photocell system which requires sufficient ambient light to permit the system to function. Likewise, in a preferred embodiment, the system of the present invention would be enclosed to avoid exposure to the elements, though if desired, a heat sink may be employed to dissipate any heat generated therein. With the system having a unitary body or structure, the entire system could thus be simply mounted in a convenient location on the vehicle or other structure supporting the lamp.

DESCRIPTION OF THE PREFERRED EMBODIMENTS

Figure 1:
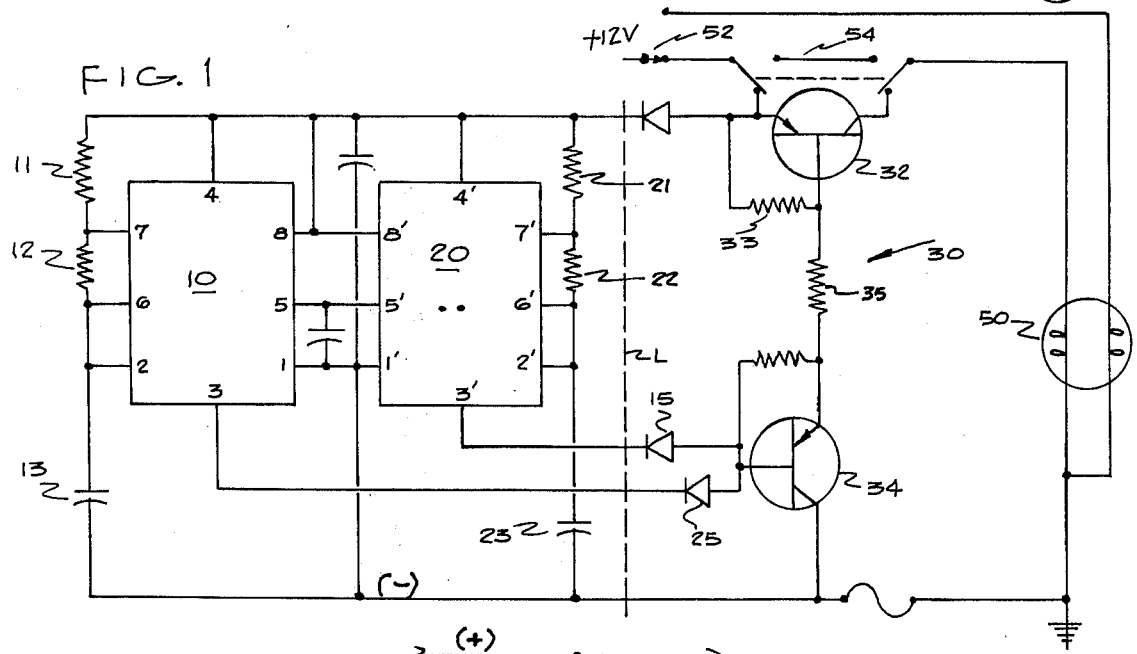
FIG. 1 is a circuit diagram of a light modulator system according to the present invention for modulating the intensity of an incandescent lamp.

Making reference to the Figures, preferred embodiments of the present invention will now be described in detail. In FIG. 1, there is shown a first timer switch means 10 in parallel with a second timer switch means 20, both of which are electrically connected to a source of power and, to an incandescent lamp 50 through a power interrupter means 30. While certainly other timer switch means 10 and 20 may be employed as desired so long as the requisite characteristics set forth herein are met, a preferred unit for use in the present invention is an integrated circuit such as a 555 IC timer chip, more particularly described hereinafter, for both timer switch means. Furthermore, the two timer switch means 10 and 20 may be incorporated into a monolithic integrated circuit chip such as a 556 IC.

As illustrated in FIG. 1, a first timer switch means 10 may, for example, be preset as to its duty cycle by resistors 11 and 12 and capacitor 13 to achieve a switching frequency of 1.0 second. Likewise, second timer switch means 20 may be preset by resistors 21 and 22 and capacitor 23 to operate at a much faster switch cycle such as 0.01 seconds. First timer switch means 10 thus determines the basic off-on mode frequency of lamp 50 through power interrupter means 30. If timer switch means 10 was employed alone, lamp 50 according to the arrangement described above would be switched on and completely off every 0.5 seconds. Due to excessive power loss, short useful life of the lamp and components, and less desirable visual awareness of modulation, it is quite advantageous that lamp 50 not lose complete illumination, but modulate at a high enough frequency to avoid same. As such, second timer switch means 20 is connected in parallel with first timer switch means 10 as illustrated. Second timer switch means 20, as mentioned above, may have a half cycle of 0.005 seconds. In this fashion, second timer switch means 20 overrides first timer switch means when switch means 10 is in the off mode to preclude a complete loss of intensity of lamp 50. Instead, with second timer switch means 20 operating at a much faster rate than first timer switch means 10, lamp 50 will not totally lose illumination, but will turn off and on at such a high frequency that the filaments remain hot. Lamp 50 thus experiences an average loss of intensity that is determined by the duty cycle of second timer switch means 20. It may be, for example, desirable to experience an average loss of intensity of 50 percent in which case second timer switch means 20 should be controlled to operate at a sufficiently increased duty cycle compared to first timer switch means 10 to achieve the average intensity reduction of 50 percent.

The light modulator system of the present invention may be incorporated at a convenient point between the power source and the head lamp. As illustrated in FIG. 1 for automotive and cycle use the system may be introduced between a dimmer switch 52 and the head lamp 50 to function only when the head lamp is operating on high beam. Supply voltage from the vehicle or cycle battery would be applied to the system only when the lights are turned on for high beam illumination and so long as the potential remains, the system would continually modulate the high beam intensity between its full output and the adjusted percentage of the full output. A further feature of the system of the present invention that may be desirable under certain circumstances would be a by-pass switch 54 which could be closed in the event of malfunction of the present modulator system to by-pass same and then permit uninterrupted high beam illumination for the lamp. More than one lamp could be modulated by a single system with plurality of lamps in parallel modulating simultaneously, or as described hereinafter, the modulation system could be arranged for switching between lamps with designated lamps modulating at preset intervals (See FIG. 3).

Figure 4:
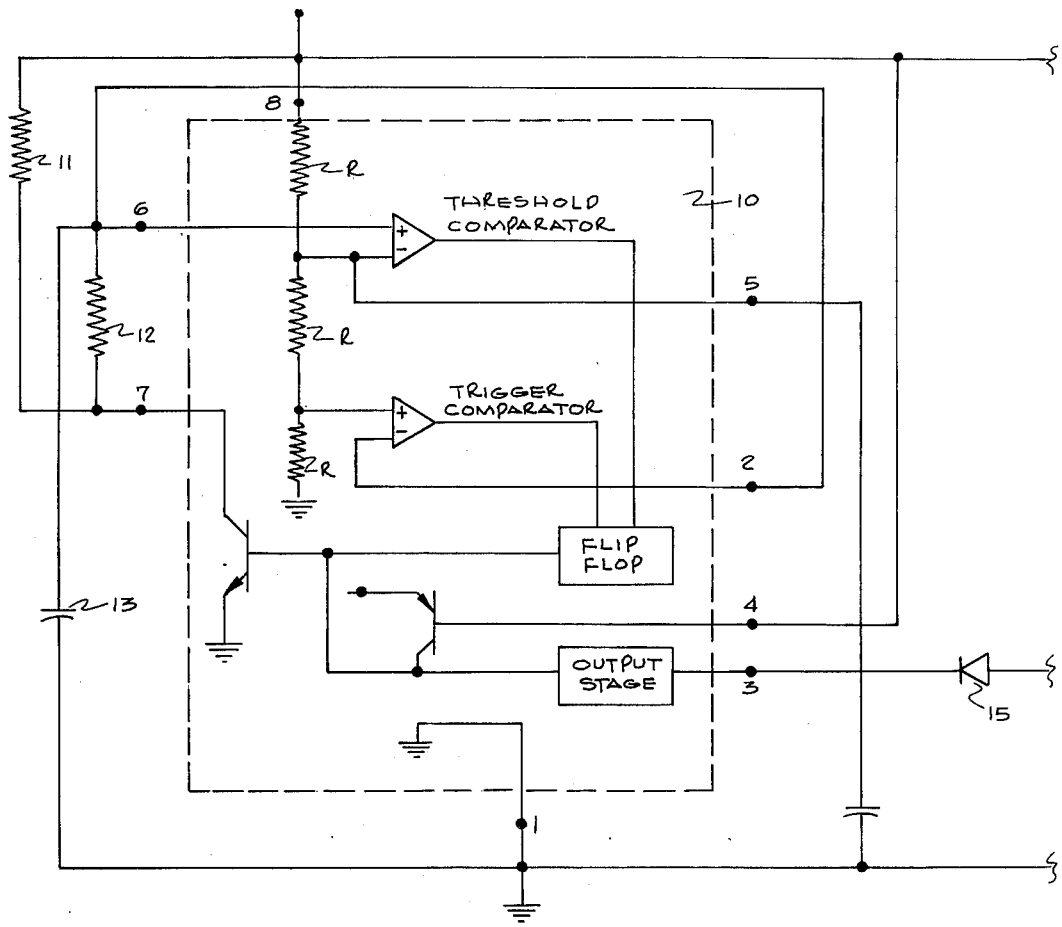
FIG. 4 is a block diagram of a suitable timer switch means according to the present invention.

In operation as illustrated in FIG. 1, and like functional block diagram for the integrated circuit in FIG. 4, which depicts a 555IC timer chip, with the head light or light of a vehicle turned on for high beam illumination, supply voltage is provided at first timer switch means 10 which unlatches pin 7 from ground, switches pin 3 from ground to a potential just below supply voltage and lowers the voltage at pin 2 to less than $\frac{1}{3}$ of supply voltage. Capacitor 13 then begins to charge through resistors 11 and 12, approaching supply voltage. When the voltage at pin 6 reaches $\frac{2}{3}$ of supply voltage the timing cycle is stopped and pin 7 is clamped to ground potential. Capacitor 13 then begins to discharge toward ground potential through resistor 12. The resistance of resistor 11 is low compared to that of 12 and has little effect on the charge time, its main function being to limit current to pin 7 while it is clamped at ground potential. When the voltage at pin 2 again reaches a value less than ⅓ of supply voltage, the timing cycle is restarted with pin 7 being again unclamped and capacitor 13 starting to recharge toward ⅔ the value of supply voltage. This cyclic operation continues as long as supply voltage is applied to the first timer switch means 10. Output from first timer switch means 10 is provided at pin 3 and a positive going square wave is produced having a half cycle period equal to 0.693 $(R_{11}+R_{12})C_{13}$ and an amplitude just short of supply voltage. As mentioned above, the half cycle period of first timer switch means 10 may be set at approximately 0.5 seconds by appropriate ratings of resistor 12 and capacitor 13.

Second timer switch means 20 functions in the like fashion as described above for first timer switch means 10 through resistors 21 and 22 and capacitor 23 such that the output from pin 3' would likewise provide a positive going square wave with a half cycle period equal to 0.693 $(R_{21} + R_{22})C_{23}$ and an amplitude just short of supply voltage. As mentioned above, the half cycle of timer switch means 20 could, for example, be set at approximately 0.005 seconds by selection of appropriate ratings of resistor 22 and capacitor 23.

The power interrupter means 30 as illustrated in FIG. 1 includes a first power transistor 32 that is controlled by a second amplifying transistor 34. With first timer switch means 10 and second timer switch means 20 in the on mode, amplifier transistor 34 is turned off and current may not flow from the base to the emitter of transistor 32 whereby transistor 32 interrupts voltage supply to head lamp 50. Conversely, when output terminal 3 or 3' of timer switch means 10 or 20 is at ground potential (in the off mode), then amplifier transistor 34 is turned on through diode 15 or 25 and current is allowed to flow from emitter to base of transistor 32 through resistor 35 and amplifier 34 to ground, thus causing transistor 32 to function as a closed switch permitting nearly full battery voltage to be supplied to head lamp 50. Resistor 33 across transistor 32 provides a shunt resistance from the base to the emitter of resistor 32 to preclude collector to base leakage during hot weather which could partially cause transistor 32 to function as a closed switch and thus produce malfunction of the system.

As just described, with first timer switch means 10 switching off and on every 0.5 seconds, pin 3 switches from ground to just short of supply voltage, amplifier transistor 34 is turned off and on through diode 15 and in turn transistor 32 is turned off and on every 0.5 seconds. Lamp 50 would thus receive full potential every 0.5 seconds. When, however, pin 3 of first timer switch means 10 is at supply potential (timer on condition) the higher frequency of second timer switch means 20 causes amplifier transistor 34 to turn off and on at a much faster rate through diode 15 which likewise carries through to power transistor 32 and lamp 50 such that lamp 50 is turned off and on at the much more rapid frequency. A complete loss of intensity is thus never experienced. The arrangement would be quite suitable for automotive, motorcycle and other use. In an automotive situation, as mentioned above, both head lamps could be connected into the system for simultaneous pulsing or sequential pulsing.

Figure 2:
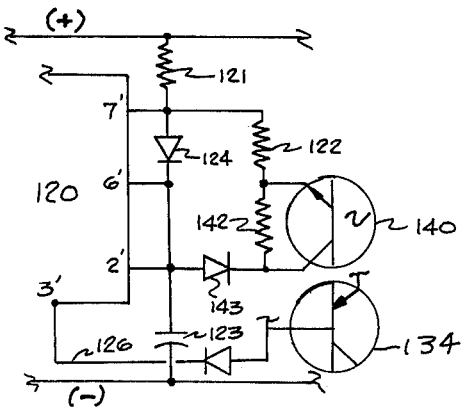
FIG. 2 is a further embodiment of the light modulator system of the present invention including photoelectric deactuator means.

FIG. 2 is illustrative of further embodimennt of the present invention, taking into consideration automatic actuation or deactuation of the modulator system depending upon ambient light. Only the portion of the schematic is shown that would be modified from that shown in FIG. 1, with like elements having a 100 prefix, to include additional apparatus that could be utilized to partially deactuate the system for more suitable motorcycle use during hours of darkness. The second timer switch means 120 is shown in part with an appropriate output lead 126 connected to output pin 3' of the integrated circuit timer switch means, through which supply potential is provided for amplifier transistor 134 to determine the state of a driver transistor (not shown) for an incandescent lamp (not shown). A photoelectric element such as a phototransistor 140 and a resistor 142 add to the resistance of resistor 122 during the discharge mode of capacitor 123. Diodes 124 and 143 serve to isolate the charge and discharge cycles of the timer. During daylight hours, ambient light falls on phototransistor 140 making it conduct whereby resistor 142 is shunted and only resistor 122 determines discharge rate of capacitor 123. During darkness, phototransistor 140 sees little or no ambient light and does not conduct whereby resistor 142 becomes in series with resistor 122, providing a much longer discharge time for capacitor 123 and thus reducing the duty cycle of switch means 120 at a time when output from timer switch means 120 is at ground, which in turn accompanies a high intensity light output. With this particular system, however, some slight modulation could continue, and permit better visual observation of the cycle while at the same time precluding sufficient intensity loss that could create visibility problems for the driver.

Figure 3:
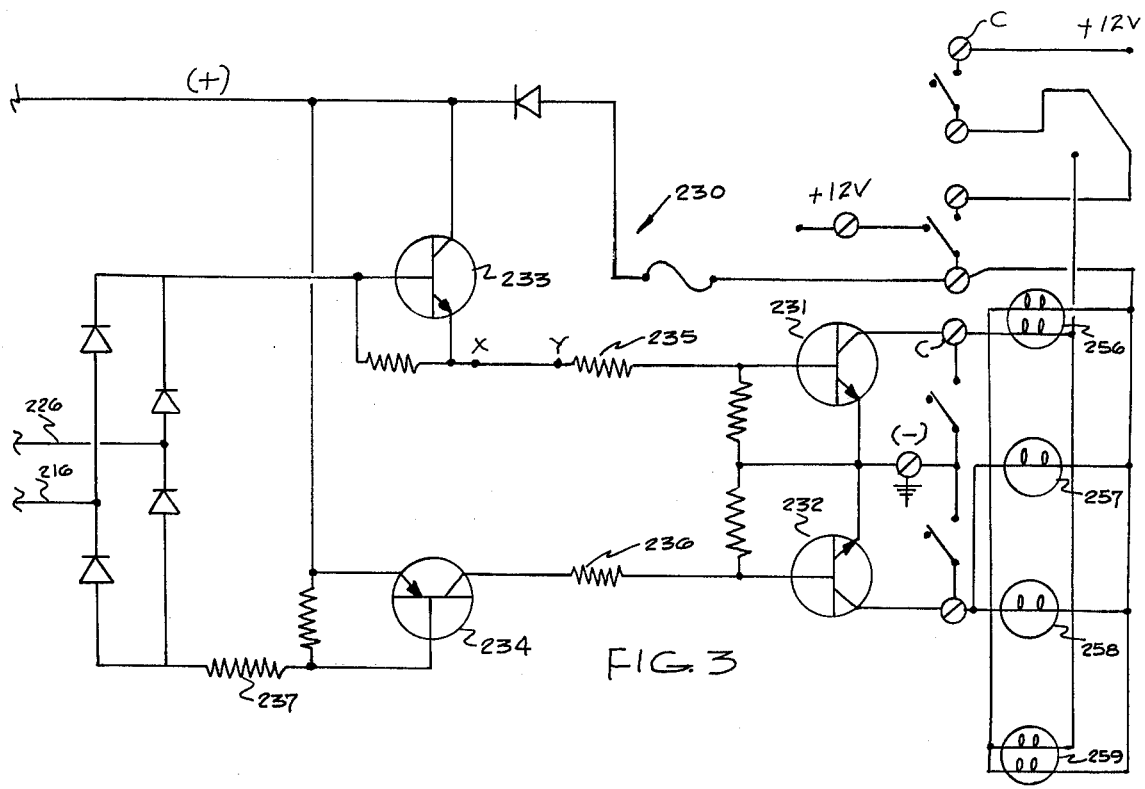
FIG. 3 is a partial circuit diagram of a further emmbodiment of the light modulator system of the present invention showing a capability of horizontal switching from light to light for modulation of intensity.

FIG. 3 illustrates a further embodiment of the present invention for use on emergency vehicles or the like where the modulation is produced sequentially between the head light or lights on the right and left hand side of the vehicle. A different visual sensation of the modulation is thus available which could afford a separate modulating system for emergency vehicles and private vehicles. In FIG. 3, the first and second timer switch means are not shown for simplicity, but could be identical to that portion of FIG. 1 to the left of a vertical dotted line L with leads 216 and 226 representing leads from output pins 3 and 3' of switch means 10 and 20, respectively. Differently from FIG. 1, however, two output circuits are utilized in the arrangement shown in FIG. 3 which are 180 degrees out of phase from each other. In the power interrupter means 230 a first power transistor 231 is electrically connected to outside head lamps 256 and 259 while a second power transistor 232 is in electrical connection with inside head lamps 257 and 258 both connections being via terminal connectors C. In like fashion as shown in FIG. 1, the power transistor 231 and 232 are electrically connected to amplifying transistors 233 and 234, through resistors 235 and 236 respectively, which determine the operational state of power transistors 231 and 232. Amplifying transistors 233 and 234 are opposite in nature such that one functions at ground potential while the other functions at supply potential. For example, amplifier transistor 233 is turned on when pin 3 or 3' (timer switch means 10 or 20 of FIG. 1) is at supply potential. Transistor 233 thus operates as an emitter follower with the input operating in phase with the output and drives power transistor 231 through resistor 235. Conversely, amplifying transistor 234 operates as a ground emitter amplifier and is turned on when pin 3 or 3' (timer switch means 10 or 20 of FIG. 1) is switched to ground potential. The output from the collector of amplifying transistor 234 operates 180° out of phase with the input due to the grounded emitter connection of the transistor. In this configuration, the input impedance of resistor 234 is very low so resistor 237 limits the current input to the base of the resistor. Hence, with first timer switch means, one of the amplifying transistors is operated at full output while the other is operated at ground, each of which is then further modified by the duty cycle of the second timer switch means. Furthermore, as a result of the phase shift in amplifying transistor 234, power transistors 231 and 232 are driven to full on at alternate times. Hence, the inside and outside high beam head lights switch from full intensity to partial intensity at alternate times thus creating modulation of intensity in the vehicle head lamps.

As shown in FIG. 3, the headlights 256 and 259 pulse alternately with lights 257 and 258. If, however, the conductor between pins x and y is removed and connected between pins y and z, lights 256, 257, 258 and 259 will pulse simultaneously since driver transistors 231 and 232 will function simultaneously.

Figure 5:
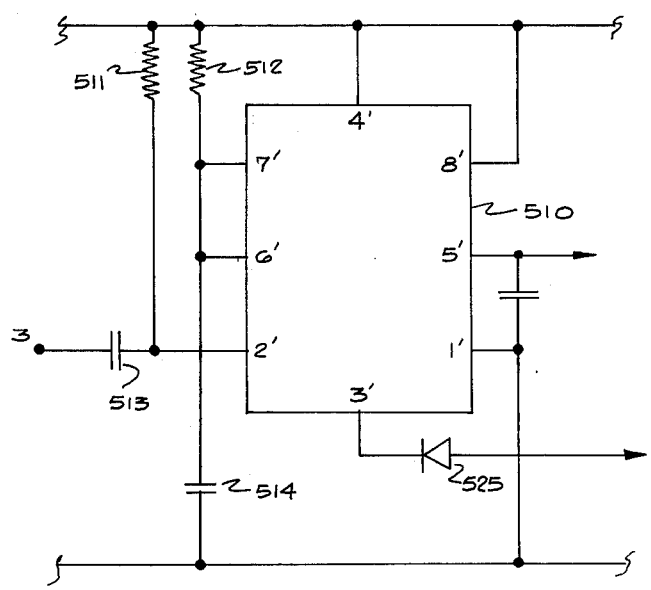
FIG. 5 is a partial circuit diagram of yet a further embodiment of the present invention.

A further embodiment of the present invention is illustrated in FIG. 5. With the arrangement of the first and second timer switch means as illustrated in FIG. 1, there is a possibility that a pulse rate within certain frequencies could induce a hypnotic effect and lose the visible stimulus of the modulation. Should such phenomena occur, a third timer switch means 510 could be included as a monostable or one shot multivibrator being connected to the output of the first timer switch means. Timer switch means 510 would only function when triggered from first timer switch means or some other outside source. The trigger input pin 2' is held at supply voltage through resistor 511. When output pin 3 of the first timer switch means switches from supply voltage to ground potential, trigger pin 2' of timer switch means 510 is driven to a point less than ⅓ of supply voltage (ground) through the coupling action of capacitor 513. Capacitor 513 charges quickly, allowing trigger pin 2' to return to supply voltage. This triggering action unlatches pin 7' of timer switch means 510 and allows capacitor 514 to charge toward supply voltage through resistor 512. Simultaneously, output pin 3' of timer switch means 510 switches from ground to supply voltage. When the charge on capacitor 514 reaches 2/3 of supply voltage, pin 7' is reclamped to ground, capacitor 514 discharges toward ground, and output pin 3' switches to ground. Timer switch means 510 then remains in this state until trigger 2' is again driven negative by output pin 3 of the first timer switch means. The duty cycle of timer switch means 510 could, for example, approximate 3½ times the on mode for the first timer switch means and would be triggered every four half cycles by the negative going action of output pin 3 of the first timer switch means. During the one-quarter second cycle when output pin 3 of first timer switch means is at ground, the incandescent lamp (not shown) is turned on through diode 525 to the base of an amplifier transistor (not shown). The composite wave form of first and third timer switch means would thus be nonsymetrical and would repeat every two seconds.

Figure 6:
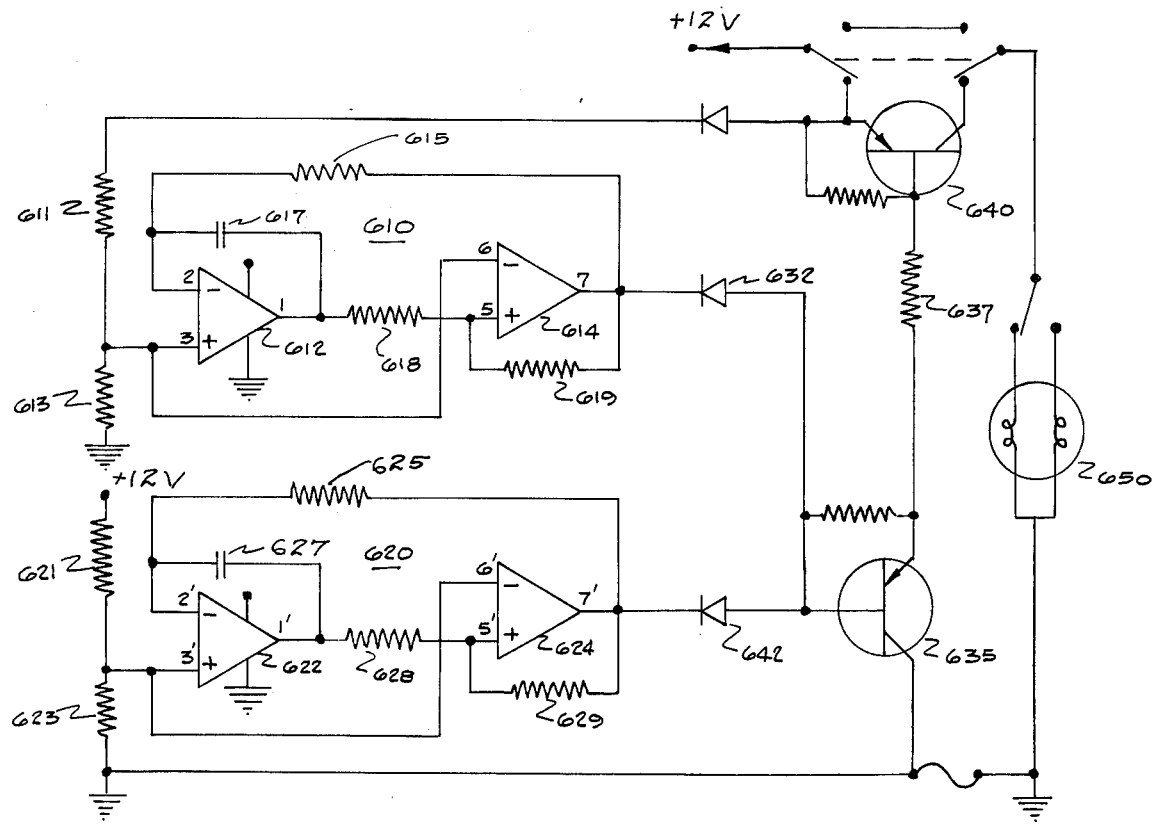
FIG. 6 is a circuit diagram for a light modulator system according to the present invention illustrating a further timer switch means arrangement.

FIG. 6 illustrates yet another form of timer switch means that may be employed with the modulation system of the present invention. A first free running oscillator generally indicated as 610 is connected in parallel with a second free running oscillator generally indicated as 620, with oscillator 610 operating at a duty cycle of 1 Hz and 620 at a duty cycle of 100 Hz. Oscillator 610 and 620 each has one operational amplifier, 612 and 622 respectively, connected as an integrator and one operational amplifier 614 and 624 connected as a positive feedback switch with hysteresis. Resistors 611 and 613 and 621 and 623 form voltage dividers and place a bias of ½ supply voltage on pins 3 and 6 of amplifiers 612 and 614 and 3' and 6' of amplifiers 622 and 624 thus setting the reference points for the integrator sections 612 and 622 and for the positive feedback switches.

When supply voltage is applied to the oscillator circuit, pins 7 and 7' of the feedback switches will switch to supply potential. Resistor 615 and capacitor 617 and 625 and 627 will cause pins 1 and 1' of amplifiers 612 and 622 to begin integrating toward ground. The ratios of resistors 618 and 619 and 628 and 629 are such that when pins 1 and 1' reach approximately 1/6 of supply voltage, pins 7 and 7' will return to ground. The integration then begins to integrate toward supply voltage. When 5/6 of supply voltage is reached, output of the positive feedback switches return to supply voltage and the integrative action results. Wave forms from pins 1 and 1' are triangular, switching between 1/6 and 5/6 of supply voltage while the wave forms at pins 7 and 7' are square, switching between ground and supply voltage. Diodes 632 and 642 couple these wave forms at pins 7 and 7' to amplifier transistor 635. If the output of either of the oscillators 610 or 620 is at ground, amplifier transistor 635 is turned on, in turn, turning power transistor 640 on through resistor 637, applying full voltage to incandescent lamp 650. Likewise, if both pin 7 or 7' of oscillator 610 or 620 is at supply voltage amplifier transistor 635 is turned off, turning power transistor 640 off and interrupting voltage supply to lamp 650. In a state when oscillator 610 is at ground at pin 7, lamp 650 operates at full intensity and when at supply voltage, amplifier transistor 635 is turned off and on by oscillator 620 at a rate of 100 Hz, thus modulating lamp 650 at approximately half intensity.

In structuring the system of the present invention, while the first timer switch means and second timer switch means are stated to be integrated circuit timer chips, obviously other oscillator or multivibrator units or any other timer switch means in general, may be utilized as illustrated above, so long as it performs the intended functon of the invention. In similar fashion, while the power interrupter means has been illustrated as transistors, any switch means may be employed so long as it will react in suitable fashion to achieve the rapid modulation of the light whereby modulation of the intensity is achieved without total loss of illumination of the light, and so long as the particular switch will withstand the rigors of such actions. For example, a bimetallic switch may be employed in conjuncton with a resistor to move the resistor into and out of connection with the lead to the lamp that supplies voltage thereto. Likewise, silicone control rectifiers may be employed as well as other known electrical switching means. The preferred arrangements, however, insofar as particular components utilized are set forth above.

Insofar as the incandescent lamp is concerned, the lamp may be utilized not only for vehicles, but also for boats, where running lights are displayed and where modulation of the running lights would permit better visual observation of same; for stop lights where a red light, for example, might be modulated to impart better visual observation when the sun or other lighted background surrounds the red light and could cause possible visual impairment; for snowmobiles; airplane running lights and landing lights; and the like. Likewise, in certain situations, depending upon the environs in which the system is utilized, sufficient heat may be generated in the power interrupter means that a heat sink is preferred to dissipate same to avoid possible interruption of the operation of the system.

Having described the present invention in detail, it is obvious that one having ordinary skill in the art will be able to make variations and modifications thereto without departing from the scope of the invention. Accordingly, the scope of the present invention should be determined only by the claims appended hereto.

What is claimed is:

1. A light intensity modulator system for at least one incandescent lamp comprising:
   (a) first timer switch means electrically connectable to a source of power;
   (b) second timer switch means connected in parallel with said first timer switch means and being operated at a faster switch cycle than said first timer switch means, said second timer switch means overriding said first timer switch means when said first timer switch means is in an off mode and operating at a switch cycle sufficiently fast to preclude complete loss of illumination of an incandescent lamp associated therewith; and
   (c) power interrupter means electrically connected to said source of power, at least one incandescent lamp and the output of said first and second timer switch means, said power interrupter means being operated by said first and second timer switch means to modulate power to said at least one lamp whereby the intensity of said at least one lamp changes without a complete intensity loss.

2. A light intensity modulator system as defined in claim 1 wherein the power interrupter means comprises a power transistor.

3. A light intensity modulator system as defined in claim 2 wherein an amplifier transistor is connected between the two timer switch means and the power transistor.

4. A light intensity modulator system as defined in claim 2 wherein a plurality of lamps are connected into the system and are modulated simultaneously.

5. A light intensity modulator system as defined in claim 1 wherein photoelectric means are incorporated into said system to at least partially deactuate said system upon the sensing of a certain light condition.

6. A light intensity modulator system as defined in claim 5 wherein the photoelectric system is a phototransistor connected across said timer switch means.

7. A light intensity modulator system as defined in claim 1 comprising further third timer switch means connected in series with said first timer switch means to operate as a one shot multivibrator, whereby a random pulse is produced to provide antihypnotic modulation.

8. A light intensity modulator system as defined in claim 1 wherein the first and second timer switch means are free running oscillators, said oscillators having one integrating operational amplifier and one operatonal amplifier connected to said integrating amplifier as a positive feedback amplifier with hysteresis.

9. A light modulator system for at least one incandescent lamp comprising:
   (a) first timer switch means connectable to a source of voltage, said first timer switch means having a duty cycle to cut said at least one lamp off and on;
   (b) a second timer switch means connected in parallal with said first timer switch means, said second timer switch means operating at a faster duty cycle than said first timer switch means, whereby said second timer switch means overrides said first timer switch means when said first timer switch means is in an off mode;
   (c) an amplifier transistor connected to an output side of said first and second timers; and
   (d) a driver transistor connected to said source of voltage and said at least one lamp and said amplifier transistor whereby the state of said driver transistor is determined by said amplifier transistor, and switches into and out of said supply voltage-lamp connection responsive thereto.

10. A light modulator system as defined in claim 9 further comprising photoelectric means connected across said timer switch means to at least partially reduce modulation upon sensing a predetermined ambient light condition.

11. A light modulator system as defined in claim 9 comprising further by-pass switch means across said system to isolate said system from said voltage-lamp connector as desired.

12. A light modulating system comprising:
   (a) supply of voltage;
   (b) at least one incandescent lamp in electrical connection with said voltage supply;
   (c) first timer switch means connected to said voltage supply, said first timer swtich means continuously switching from ground to supply potential at a predetermined frequency so long as voltage potential is supplied thereto;
   (d) second timer switch means connected in parallel with said first timer switch means, said second timer switch means continuously switching from ground to supply potential at a predetermined frequency so long as voltage is supplied thereto, the switching frequency of said second timer switch means being greater than said first timer switch means;
   (e) an amplifier transistor connected to the output side of both of said timer switch means and switching off and on responsive thereto; and
   (f) a driver transistor connected to said voltage supply and said lamp and said amplifier transistor and interrupting voltage potential to said lamp dependent upon the state of said amplifier transistor.

13. A light modulator system as defined in claim 12 further comprising a second amplifier transistor and a second driver transistor connected to said voltage supply and at least one further lamp and the output sides of said first and second timer switch means, said second amplifier transistor being opposite in nature to said first amplifier transistor to be operational only when said first amplifier transistor is not operational, whereby the at least one lamp connected to said first driver transistor is modulated alternately with at least on lamp connected to said second driver transistor.

14. A method of modulating the output intensity of an incandescent lamp comprising the steps of:
   (a) supplying a voltage potential to said lamp to provide the desired output intensity thereat;
   (b) cyclically interrupting said voltage potential to said lamp at a first frequency;
   (c) overriding said first frequency interruption with a second cychc voltage interrupter at a second frequency, said second interrupter frequency being sufficiently faster than said first frequency that said incandescent lamp is precluded from complete loss of illumination at any operational time.

* * * * *

UNITED STATES PATENT AND TRADEMARK OFFICE
CERTIFICATE OF CORRECTION

PATENT NO. : 4,114,071
DATED : September 12, 1978
INVENTOR(S) : Herbert T. Thrower, Jr. and Donald S. Wasness It is certified that error appears in the above-identified patent and that said Letters Patent are hereby corrected as shown below:

In Claim 8, Column 9, line 61, delete "operatonal" (second occurrence), and insert --operational--.

In Claim 9, Column 10, line 1, delete "parallal" and insert --parallel--.

In Claim 13, Column 10, line 55, delete "on" and insert --one--.

In Claim 14, Column 10, line 64, delete "cychc" and insert --cyclic--.

Signed and Sealed this

Sixth Day of March 1979

[SEAL]

Attest:

RUTH C. MASON
Attesting Officer

DONALD W. BANNER
Commissioner of Patents and Trademarks